Jan. 2, 1940.   E. R. ODOM   2,185,678
MOLDING MACHINE FOR PLASTICS
Filed Feb. 24, 1938    2 Sheets-Sheet 1
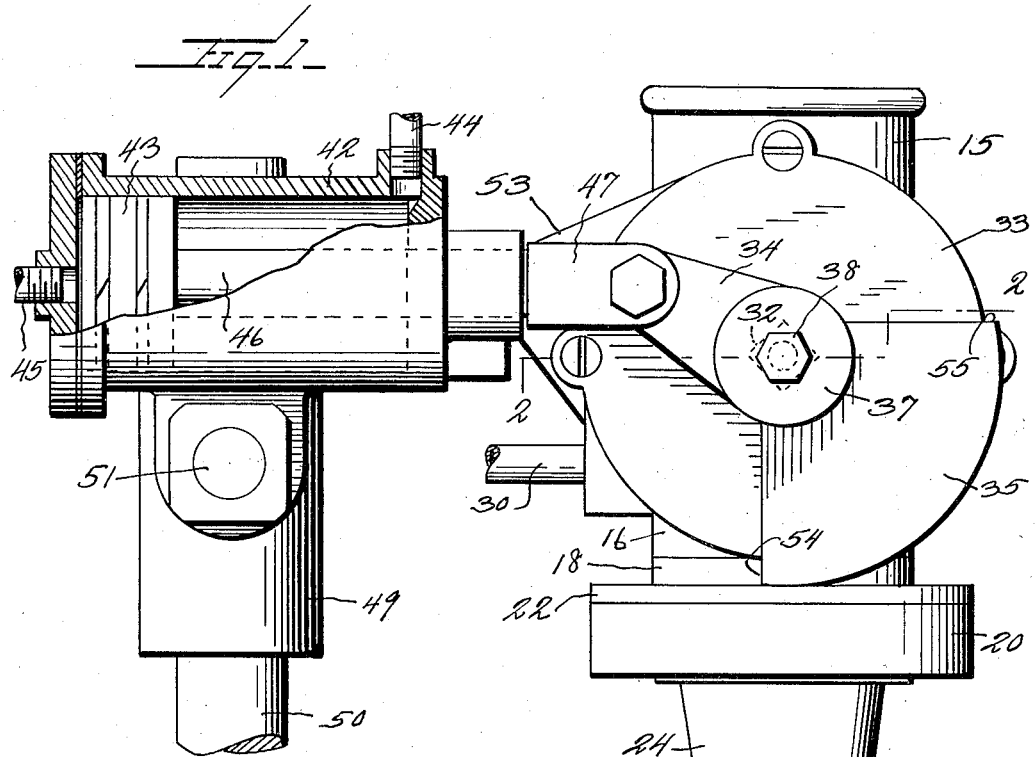
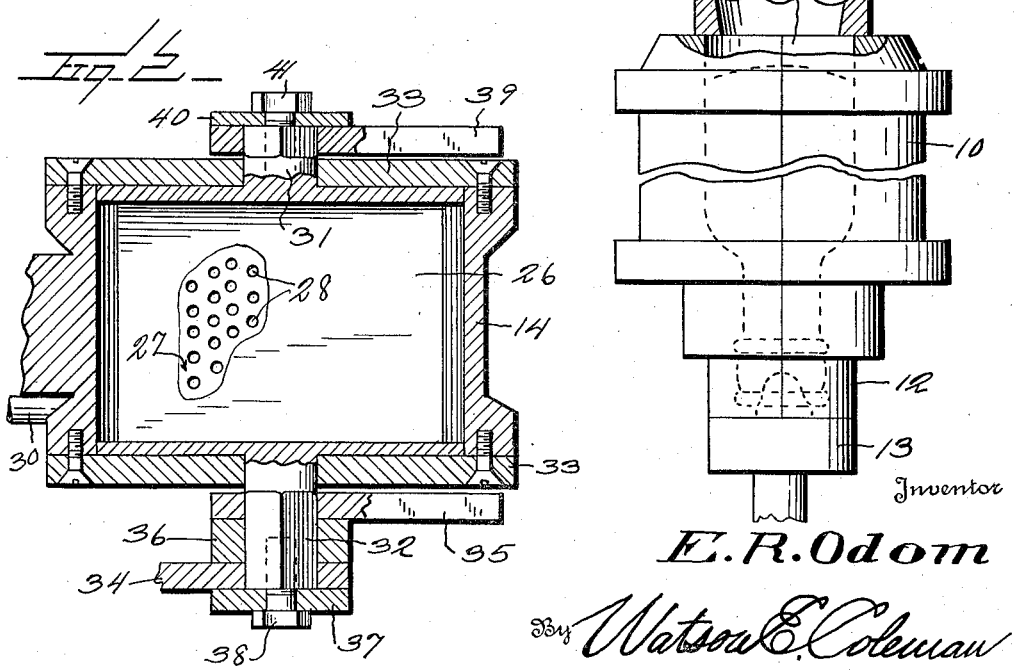
Inventor
E. R. Odom
By Watson E. Coleman
Attorney

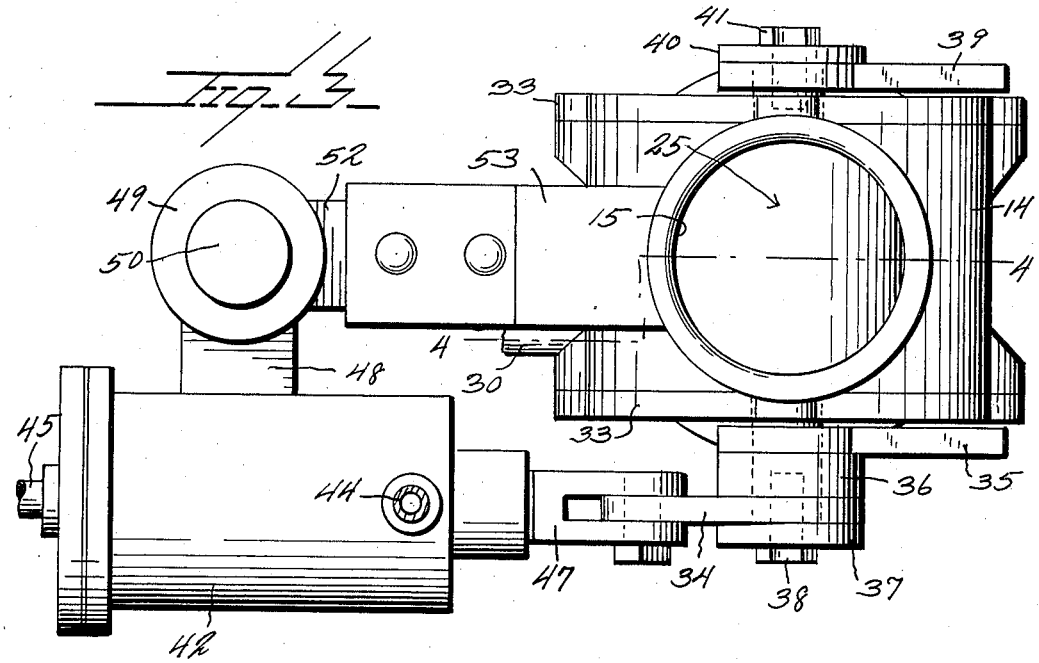
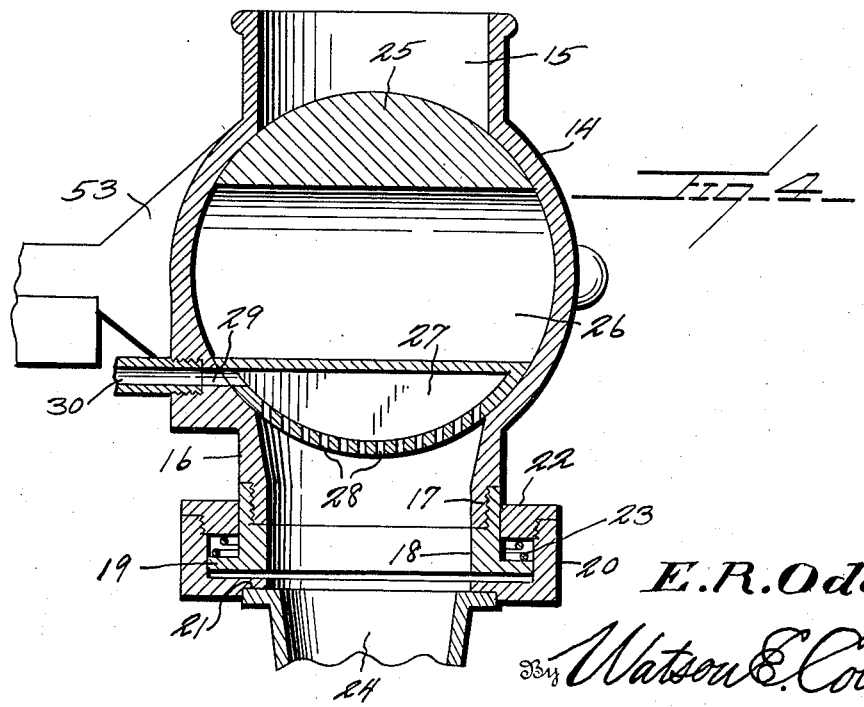

Patented Jan. 2, 1940

2,185,678

UNITED STATES PATENT OFFICE 2,185,678

MOLDING MACHINE FOR PLASTICS

Earl R. Odom, Marion, Ind., assignor of one-tenth to John B. Sisson, Marion, Ind.

Application February 24, 1938, Serial No. 192,351

11 Claims. (Cl. 49—5)

This invention relates to the formation of articles out of glass, ceramic material, plastics or metal, by means of air pressure and particularly to means for forcing gobs of glass or other material in a molten or plastic condition into a blank forming mold. Hereafter I shall, for convenience, refer to the molding or casting of glass, but I wish it distinctly understood that the mechanism is also applicable to the molding or casting of molten metal, ceramic material or other plastic material.

The general object of the invention is to provide a machine of this character in which gobs of molten glass are deposited in a hopper, the gob allowed to pass through a valve and thence to the mold, means being provided for turning the valve to a closed position and allowing air under pressure to flow into the top of the mold, thus forcing the charge of molten or plastic material into the mold.

A further object is to provide improved means for automatically operating a valve and for automatically sealing the glass discharging funnel to the blank mold at the time that air is being discharged into the mold.

A still further object is to so construct the machine that it may be mounted for swinging movement into or out of position above the blank mold.

Other objects will appear in the course of the following description.

My invention is illustrated in the accompanying drawings wherein:

Fig. 1 is an elevation partly broken away of my glass casting mechanism.

Fig. 2 is a section on the line 2—2 of Fig. 1.

Fig. 3 is a top plan view of the structure shown in Fig. 1.

Fig. 4 is a section on the line 4—4 of Fig. 3.

Referring to these drawings, 10 designates a blank casting mold of any suitable or usual character having an interior cavity 11 which has the form of the article to be reproduced as, for instance, the form of an inverted bottle. The lower end of this blank casting mold includes a finishing die 12 which has a contour such as to finish the mouth of the bottle neck and disposed against the underface of the finishing die is a plunger 13. It will be understood that the blank forming mold 10 may have a cavity of any desired shape within it and that, of course, these molds will have different diameters depending upon the article to be reproduced.

Disposed above the upper end of the blank forming mold is a cylindrical chamber 14 having a relatively large inlet mouth or hopper 15. Below the chamber 14 there is provided the downwardly extending neck 16 exteriorly recessed and screw-threaded at 17 for engagement by a sealing head 18 having an outwardly extending annular flange 19. This sealing head 18 has an interior diameter the same as the diameter of the opening through the neck 16. Surrounding the flange 19 is an annular casing or collar 20 having a horizontal flange and an upwardly extending peripheral flange. The horizontal flange is rabbeted at 21 on its inner margin and the upwardly extending flange is interiorly screw-threaded at its upper end for engagement with an exteriorly screw-threaded collar or ring 22. This ring fits against the exterior of the neck 16 and the portion 18 and has sliding engagement therewith. Between the flange 19 and this ring 22 is disposed a coiled compression spring 23 which urges the ring 22 and its attached collar 20 upward and disposed below the collar or casing 20 is a funnel 24 which at its lower end rests upon the upper face of the mold 10. The lower end of this funnel has an opening which is slightly smaller than the opening at the top of cavity 11.

Disposed within the chamber 14 is a cylindrical valve 25 having a relatively large diametrical passageway 26, the diameter of this passageway being nearly as large as the diameter of the hopper 15 and the discharge opening through the neck 16. On one side of the valve there is formed the air chamber 27 which extends the whole length of the valve and is formed at its middle with a plurality of apertures 28. These apertures extend in rows through the lower wall of the chamber 27, the rows of apertures extending from one end of the chamber to the other. When the valve is in the position shown in Fig. 4, these apertures 28 are directed downward into the neck 16. When the valve is turned into a position at right angles to that shown in Fig. 4, these apertures are prevented from discharging air by contact with the wall of the chamber 14. Opening through the side wall of chamber 14 is an air inlet port 29 connected by a pipe 30 to a source of air under pressure and, of course, when the valve is turned from the position shown in Fig. 4, this port 29 will be closed.

The valve 25 is rotatably mounted upon two stub shafts 31 and 32 passing through the end walls 33 of the valve casing 14, as shown in Fig. 2. The stub shaft 32 is squared at its outer end portion and carries upon it the crank arm 34 and a segmental cam 35 having an eccentric face.

A washer 36 is disposed between the cam 35 and the arm 34. A washer 37 is disposed against the cam 34 and a cap screw 38 passes through the washer, enters the shaft 32 and holds the cam and crank arm in place. The shaft 31 carries on it a cam 39 which is a duplicate of the cam 35 and disposed exactly in the same position. This cam is also held upon the shaft 31 by means of the washer 40 and the cap screw 41.

Disposed to one side of the chamber 14 and its allied parts is a cylinder 42 having therein a piston 43. This cylinder has a port 44 at one end of the cylinder and a port 45 at the other. The piston rod 46 is connected by a yoke 47 to the crank arm 34, as shown in Fig. 1. The piston may be operated by steam, compressed air or other motive fluid and the entrance of motive fluid to the cylinder and the discharge of motive fluid therefrom is controlled by suitable valves not shown. It will be noted from Figs. 1 and 3 that the cylinder 42 is provided with a laterally extending arm 48 carrying a vertical tubular bracket 49 which surrounds and is adapted to be mounted on a vertical supporting shaft 50. The bracket 49 with the cylinder may be held in any desired position by means of a set screw 51 extending through the tubular bracket 49 and bearing against the shaft. By loosening the set screw, the bracket 49 may be adjusted up or down or turned upon the supporting shaft 50. The tubular bracket 49 also carries a laterally extending arm 52 upon which is bolted an extension or arm 53 which forms part of the valve casing or cylinder 14. Thus all of the mechanism heretofore described is mounted upon this vertical shaft 50 and may be rotated into or out of position with the funnel 24 immediately above the mold 10 or may be adjusted vertically to suit different heights of molds. It will be noted that the segmental cams 35 and 39 have an eccentric periphery, the radius of the cam at the end 54 being greater than at the end 55. The periphery of each cam bears against the collar 22 and thus forces this collar 22 along with the member 20 and the funnel 24 downward against the upper face of the mold when the cam is in the position shown in Fig. 1.

When the parts are in the position shown in Fig. 1, the valve 25 is in the position shown in Fig. 4, but when the piston 43 is at the right-hand end of the cylinder 42, the valve 25 is turned so that the passage 26 is vertical and connects the hopper 15 with the neck 16. With the parts in the last-named position, the short end of each cam is vertical and thus the collar 22, the portion 20 and the funnel 24 are urged upward. With the parts in this last described position, a gob or mass of molten glass is placed within the hopper or opening 15 and passes downward through the passageway 26 and through the neck 16 and funnel 24 into the mold cavity 11. Motive fluid is then discharged through pipe 44 into the interior of the cylinder 42 forcing the piston 43 over to the left, that is, in the position shown in Fig. 1. This causes the cams 35 and 39 to force the collar 22, the member 20 and the funnel 24 down tight against the mold. When the piston is moved to the left or into the position shown in Fig. 1, the valve 25 is turned to the position shown in Fig. 4, thus cutting off the hopper 15 and bringing the perforated wall of chamber 27 immediately above the passage through the neck 16. This movement of the valve also connects port 29 with the interior of the chamber 27 and air under pressure is forced into the chamber 27 and down through the perforations 28 into the mold cavity, thus forcing the molten mass into the mold itself and completely filling the mold, the finishing die 12 finishing the mouth end of the bottle, if a bottle is being formed, while the plunger 13 has a portion shown in dotted lines in Fig. 1, which extends up into the mouth of the bottle.

It is to be understood that this molding machine receives its glass from a feeding device which is located directly above the hopper 15. The amount of glass required for any certain size of bottle or other article is governed by the feeding device. This feeding device is not part of my invention and, therefore, it is not illustrated. The feeding device forces a gob of glass through an orifice by means of a clay plunger. As this happens a valve is tripped by the feeding device which admits air into the air port 44 (see Fig. 1) thus driving the piston 43 back to the position shown in Fig. 1. On the feeding device is another automatically tripped valve which is adjustable to allow air to be discharged downward through the perforations 28 to blow the glass down into the mold for as long a period of time as is required to finish the article. This trip valve, when operated, causes air to pass into the pipe 45, which drives the piston forward, thus oscillating the valve to cut off the air supply through the port 29 and bringing the valve 25 to a position to receive the next gob of glass.

The plunger 13 is attached to the end of a shaft which reciprocates to force the end of the plunger into the finishing die 12 to form the mouth of the bottle. This plunger 13 is merely forced upward to stop the glass from blowing out through the finishing die or ring 12 and also form the mouth of the bottle. After this plunger is pulled away, air is supplied to the opening in the lower end of the finishing die, thus blowing the glass up and out against the side of the mold and forming the hollow interior of the bottle. The finishing die 12 is preferably made in two sections as is also the mold 10, and is held as usual in a holder constructed on the principle of a hinge whereby the two halves of the mold or finishing die may be brought together or opened up. I have not illustrated the detailed construction of the finishing die 12 nor of the plunger nor of the holder for the finishing die or mold as these parts are well known and they have no relation to my invention.

Attention is particularly called to the fact that the funnel 24 is automatically sealed against the mouth of the mold at the time the air is turned on in chamber 27, thus preventing any possible escape of air and causing the full pressure of the air to act upon the glass. My structure is mounted upon the vertical shaft 50 in such manner that the cylinder 42 and the valve casing 14 may be readily turned away from over the mold by rotating the structure upon the supporting shaft.

While I have described the admission of motive fluid to the cylinder 42 as being controlled by automatic valves, it is to be understood that these valves might be operated manually if desired. It will be seen that the perforations 28 may be readily cleaned if they should become clogged by rotating the valve to a position where these perforations 28 are disposed opposite the mouth 15 or hopper.

What is claimed is:

1. Mechanism as described for use in association with a mold in plastic molding, comprising a cylinder having an inlet hopper opening through the periphery of the cylinder and receiving the plastic mass, the cylinder having an opening for discharging the mass into the mold, a cylindrical valve in the cylinder having a diametrically extending passage, one wall of the valve below the passage having an air chamber formed with apertures discharging toward the mold when the valve is turned with its passage extending transversely of the mold, and means connecting the air chamber with a source of air under pressure when the air chamber is disposed in the last-named position.

2. Mechanism as described for use in association with a mold in plastic molding, comprising a cylindrical chamber having an inlet hopper opening through the periphery of the cylinder and adapted to receive the plastic mass, the chamber having a discharge opening adapted to be directed into the mold, a cylindrical valve in the chamber having a diametrically extending passage, the wall of the valve at one side of the passage having an air chamber formed with apertures discharging toward the mold when the valve is turned with the passage thereof extending across the inlet hopper, a pressure-operated motor having an oscillatable piston, the piston being operatively connected to the cylindrical valve, and means for alternately admitting pressure fluid on opposite sides of the piston.

3. Mechanism as described for use in association with a mold in plastic molding, comprising a cylindrical chamber for disposition above the mold and having an inlet hopper at its upper end and a downward extension at its lower end, a cylindrical valve in the chamber having a diametrically extending passage, one wall of the valve having an air chamber disposed below the passage and having a plurality of perforations discharging downward into the extension, a crank arm on the exterior of the chamber and operatively connected to the valve, motor operated means for shifting the crank arm in a direction to carry the passage into a vertical position or into a horizontal position with the air chamber discharging into the extension, means for communicatively connecting the air chamber with a source of air when the air chamber is in the last-named position, and means for automatically forcing the downward extension into air-tight engagement with the mold when the valve is in the last-named position.

4. Mechanism as described for use in association with a mold in plastic molding, comprising a cylindrical chamber having an inlet hopper disposed thereabove and opening into the cylinder, the cylinder having a downward extension at its lower end, a cylindrical valve in the chamber mounted for oscillation and having a diametrically extending passage adapted when the valve is turned in one position to communicatively connect the hopper with said extension, the lower wall of the valve below the passage being formed with an air chamber having a plurality of perforations in the outside wall of the valve, the perforations discharging downward into the said downward extension when the valve is turned with its passage extending diametrically across the cylindrical chamber, means for connecting the air chamber with a source of air under compression when the valve is in the last-named position, motor-operated means for oscillating said valve, cams mounted to oscillate with the valve, and means adapted to be engaged by said cams constructed and arranged to force the extension downward against the upper end of the mold when the valve has been turned to bring the perforations of the air chamber in coincidence with said downward extension.

5. Mechanism as described for use in association with a mold in plastic molding, comprising a cylindrical chamber disposed above the mold and having an inlet hopper and opposite the inlet hopper a downward extension formed with an outwardly projecting flange, a collar loosely surrounding said flange, a spring disposed between the flange and the collar and urging the collar upward, a funnel engaged by the collar and designed to rest upon the mold, and cams associated and operating with the valve and when the valve is turned into the last-named position bearing against said collar to thereby urge the collar and the funnel downward for engagement with the mouth of the mold against the action of said springs.

6. Mechanism as described for use in association with a mold in plastic molding, comprising a cylindrical chamber having an inlet hopper at its upper end to receive the plastic mass and having a downward extension at its lower end, a collar loosely surrounding the downward extension and designed to operatively engage the mouth of the mold, a spring urging said collar upward, a cylindrical valve disposed within the cylindrical chamber and having trunnions extending through the end walls of the chamber, the valve having a diametrically extending passage adapted to communicatively connect the hopper with the downward extension of the chamber when the valve is in one position, the lower wall of the valve being formed to provide an air chamber and having perforations discharging downward into the extension when the valve is turned with its passage transverse to the extension, means for admitting air under pressure to said air chamber when the valve is turned in the last-named position, a crank mounted upon one of said trunnions for oscillating the valve, motor-operated means for shifting said crank alternately in opposite directions, and a pair of eccentric cams mounted upon the trunnions and engaging with the collar to force the collar downward and secure air-tight contact with the said mouth of the mold when the valve is turned into position to discharge air from the air chamber into the extension of the cylindrical chamber when the valve is turned into position with the air chamber discharging into the mold.

7. Mechanism as described for use in association with a mold in plastic molding, comprising a cylindrical chamber having an inlet hopper at its upper end and a downward extension at its lower end, an oscillatable cylindrical valve disposed within the chamber and having a diametrically extending passage, one wall of the passage being formed to provide an air chamber having perforations in its outside wall, the valve having trunnions extending through the walls of the cylindrical chamber, a collar loosely embracing the lower end of said extension and having air-tight engagement therewith, a spring urging the collar upward relative to the extension, a funnel engaged by the collar and designed to rest upon the top of the mold, a motor including a cylinder having ports at its opposite ends, a piston operating in the cylinder, a crank arm on one of the trunnions with which the piston is operatively connected, and a pair of eccentric cams mounted upon the trunnions and engaging with said collar to force the collar downward when the valve has been turned with its passage extending transversely of the inlet and outlet of said valve chamber.

8. Mechanism as described for use in association with a mold in plastic molding, comprising a cylindrical valve chamber having an inlet hopper at its upper end and a discharge extension at its lower end designed to rest upon the top of the mold, an oscillatable valve mounted within the cylindrical chamber and having a diametrically extending passage, one wall of the valve being formed to provide an air chamber having perforations which in one position of the valve discharge downward through said outlet extension, means for connecting the air chamber with a source of air when the valve is turned to the last-named position, a motor for operating the valve, a vertically extending support, a tubular bracket rigidly connected to the motor and to the valve chamber and rotatable upon the vertical support to carry the valve chamber and its extension into or out of register with the mold, and means for clamping the tubular bracket upon the support.

9. Mechanism as described for use in association with a mold in plastic molding, comprising a plastic material receiver having a discharge mouth adapted to contact the mold, means in the receiver for transferring the material therefrom to said mouth and simultaneously closing the receiver, and means for automatically injecting air under pressure through said mouth for effecting the forcible introduction of the plastic material into the mold.

10. Mechanism as described for use in association with a mold in plastic molding, comprising a plastic material receiver including a rotary transfer member and a discharge mouth, said discharge mouth being adapted to contact the mouth of a mold, said rotary transfer means when shifted to one position closing communication between the receiver and said mouth and automatically establishing communication between said mouth and a source of air under pressure for the discharge of such air through the mouth to effect the forcible injection of the plastic material into the mold.

11. Plastic material handling means for use in association with a mold having a receiving mouth, comprising a receiver for the plastic material, means for conducting the material from the receiver to said mold mouth, and means controlled by said conducting means immediately following the conduction of the plastic material to the mold mouth for discharging air under pressure into the mold mouth for the forcible introduction of the plastic material into the mold.

EARL R. ODOM.